United States Patent [19]

Goldhaar

[11] Patent Number: 5,069,689
[45] Date of Patent: Dec. 3, 1991

[54] CLOSED LOOP POLLUTION CONTROL SYSTEM

[75] Inventor: Abraham Goldhaar, Los Angeles, Calif.

[73] Assignee: Westates Carbon, Los Angeles, Calif.

[21] Appl. No.: 652,116

[22] Filed: Feb. 7, 1991

[51] Int. Cl.$^5$ ............................................. B01D 53/08
[52] U.S. Cl. .......................................... 55/61; 55/62; 55/68; 55/79; 55/74; 55/180; 55/181; 423/234
[58] Field of Search ...................... 55/61, 62, 79, 181, 55/68, 74, 180; 423/234

[56] References Cited

U.S. PATENT DOCUMENTS

| | | | |
|---|---|---|---|
| 2,397,566 | 4/1946 | Schutte | 55/181 |
| 2,614,657 | 10/1952 | Nicholson | 55/61 |
| 2,651,603 | 9/1953 | Martin | 55/62 |
| 2,684,731 | 7/1954 | Starr | 55/62 |
| 2,782,866 | 2/1957 | Etherington et al. | 55/61 |
| 2,793,713 | 5/1957 | Fritz et al. | 55/61 |
| 4,374,092 | 2/1983 | Marquess et al. | 422/199 |
| 4,455,282 | 6/1984 | Marquess et al. | 422/199 |
| 4,966,611 | 10/1990 | Schumacher et al. | 55/62 |
| 4,969,936 | 11/1990 | Schweigert et al. | 55/179 |

FOREIGN PATENT DOCUMENTS 3813517 11/1989 Fed. Rep. of Germany .......... 55/79

OTHER PUBLICATIONS

"Electric Carbon Regenerator", by Marquess and Nell, Inc., 3 pages, 1989.

Primary Examiner—Bernard Nozick
Attorney, Agent, or Firm—F. Eugene Logan

[57] ABSTRACT

Many industrial operations generate and release volatile organic compounds. The fumes, frequently mixed with large quantities of air, are collected and sorbed on activated carbon. The spent sorbent is frequently sent to an off-site facility for reactivation since on-site reactivation of the spent sorbent has heretofore been very costly. Shipping of hazardous waste products such as spent sorbents containing sorbed volatile organic compounds on public roads is a growing concern of governmental bodies and regulations requiring on-site handling are anticipated.

This invention provides a closed loop system for on-site reactivation of the spent sorbent and incineration of the contaminants. The combustion gases are cleaned simultaneously with the main gas stream containing the volatile organic compuonds so that only cleaned gases are vented to the atmosphere.

30 Claims, 3 Drawing Sheets

CLOSED LOOP POLLUTION CONTROL SYSTEM

BACKGROUND OF THE INVENTION

Filtration apparatuses for filtering air are disclosed in U.S. Pat. No. 4,969,936. The apparatuses have elongated plenum chambers which comprise activated carbon contained in a V-shaped housings. Since the V-shaped housings maximize the filtration area of the apparatuses per unit area of floor space, the filtration apparatuses of U.S. Pat. No. 4,969,936 are particularly useful in the systems and processes of this invention.

Methods and apparatus useful for reactivating spent carbon sorbent are disclosed in U.S. Pat. Nos. 4,374,092 and 4,455,282. The furnace disclosed therein is particularly useful in the systems and processes of this invention.

SUMMARY OF THE INVENTION

This invention is concerned with pollution control of contaminants in gaseous streams. It is generally not considered economical to reactivated carbon on site if the amount of activated carbon is below about 750,000 lbs per year. Facilities using below this amount shipped their spent sorbent to a reactivating facility for reactivation or contracted with a supplier of activated carbon for removal and replacement of their spent sorbent. Concerns of communities and governments on the federal, state and local level are growing over the expanding volume of any hazardous wastes being transported on public roads and through communities. The need therefore arises for users of smaller amount of activated carbon to have on-site capability to reactivated their spent carbon.

It is believed that in the near future manufacturing plants, refiners, waste treatment plants and many other operations will be forced to become self contained with regard to handling their hazardous wastes.

Some activated carbon users are searching for alternatives to activated carbon usage due the cost and growing liabilities associated with off-site transportation and reactivation. Accordingly there is an urgent need for apparatus and processes for reactivating spent sorbent at the user's site.

To make the process and apparatus economical for smaller users of activated sorbents, the apparatus must not be excessively large, otherwise the reactivation operation can become as large or larger than the user's principal operation, which in a worst case could require relocation of the business to a larger site principally to accommodate pollution control equipment. If the contaminants removed from the spent sorbents are combusted in the conventional manner, the size of apparatus will be to large for on-site reactivation by most. Accordingly there is a need for a process and system that is small enough for installation on the sites of users of smaller amount of sorbents.

This invention provides an apparatus and process for on-site reactivation of both large and small amounts of spent sorbent. In particular this invention is directed towards a closed loop process and apparatus for removing contaminants from a main gas stream by sorption of the contaminants on a sorbent, reactivation of the spent sorbent on-site by separating the sorbed contaminants from the sorbent, heating the contaminants to an elevated temperature, and combusting the heated contaminants with a predetermined amount of air. The predetermined amount of air is from about the stoichiometric amount required for complete combustion of the contaminants to about 50% of the main gas stream. The process further involves removing contaminants such as carbon dioxide, hydrochloric acid and chlorine, sulfur oxides and nitrogen oxides from the combustion gas, and then treating the combustion gas with activated sorbent before venting to the environment so that contaminants from all gas streams, including streams associated with reactivating the spent sorbent, are treated with activated sorbent before being vented. In other words the entire system is a closed loop system, including the main gas stream treatment and the spent sorbent reactivation, with only a cleaned gas being vented from the entire system. Furthermore, the entire apparatus and process are designed for on-site installation and operation.

Accordingly there is provided by the principles of this invention a closed loop process for cleaning contaminated main gas stream with activated sorbent, reactivating spent sorbent, and combusting the contaminant. In its simplest embodiment the process begins with a first phase by introducing a main gas stream containing a contaminant into a sorption zone and sorbing the contaminant on activated sorbent contained therein. After the activated sorbent in the sorption zone sorbs a predetermined amount of contaminant, the introduction of the contaminated main gas stream into the sorption zone is stopped.

The next phase begins by conveying the spent sorbent from the sorption zone to a reactivation zone, recharging activated sorbent to the sorption zone, and, resuming introducing the main gas stream containing the contaminant to the sorption zone.

The process further comprises heating the spent sorbent in the reactivation zone to an elevated temperature, sometimes referred to herein as the first predetermined elevated temperature, and removing the contaminant from the spent sorbent with a gas stream, sometimes referred to herein as the second gas stream, thereby producing an reactivated sorbent and a contaminant laden gas stream.

The contaminant laden gas stream is separated from the reactivated sorbent, and then heated in the presence of oxygen in a combustion zone to a predetermined temperature, sometimes referred to herein as the second predetermined temperature, operable for combusting the contaminant. The amount of oxygen being sufficient to oxidize the contaminant in the contaminant laden gas stream. The second predetermined temperature being higher than the first predetermined elevated temperature. In one embodiment the first predetermined temperature is from about 500° C. to about 700° C., the second predetermined temperature is from about 800° C. to about 1000° C., and the third predetermined temperature is from about 50° C. to about 150° C.

The combined flow of the second gas stream and the oxygen is controlled so that it is no greater than about 50% of the flow of the main gas stream. In one embodiment the combined flow of the second gas stream and the oxygen is no greater than about 10% of the flow of the main gas stream, and in another embodiment the combined flow is no greater than about 1% of the flow of the main gas stream. In one embodiment the second gas stream is selected from the group consisting of air, steam, nitrogen, oxygen and mixtures thereof. In a preferred embodiment the second gas stream contains oxygen and steam. In another embodiment the amount of oxygen mentioned in step (i) is sufficient to oxidize at least about 95% of the contaminant in the contaminant laden gas stream.

The combustion gas is cooled to a lower temperature, sometimes referred to herein as the third predetermined temperature, and its relative humidity adjusted to less than 50%. The combustion gas is then contacted with the activated sorbent in the sorption zone to remove undesirable components in the combustion gas thereby forming a cleaned combustion gas suitable for venting. The cleaned combustion gas and the cleaned main gas stream are then vented from the sorption zone.

After the activated sorbent in the sorption zone sorbs the predetermined amount of the contaminant the flow of contaminated main gas stream into the sorption zone is again stopped, the sorption zone is recharged with reactivated sorbent, and, the process resumed.

In another embodiment, after cooling the combustion gas to a third predetermined temperature, the process further comprises scrubbing the combustion gas with a scrubbing agent effective for removing a combustion product from the combustion gas which is not desirable to vent. For example the scrubbing agent can be effective for removing combustion products such as chlorine containing gases, sulfur oxides, nitrogen oxides, carbon oxides or mixtures thereof. Thereafter the relative humidity of the combustion gas is adjusted. In another embodiment the combustion gas is scrubbed a second time before having its humidity adjusted. In one embodiment the scrubbing agent is a dilute caustic solution.

In one embodiment the combustion gas is cooled to a predetermined temperature which is low enough to condense water vapor in the combustion gas and form a condensate, and the process further comprises separating the condensate from the combustion gas, and thereafter adjusting the relative humidity of the combustion gas.

In one embodiment the heating the spent sorbent in the reactivation zone to the first predetermined temperature is performed electrically. In another embodiment the second gas stream and the spent sorbent flow countercurrently through the reactivation zone. In yet another embodiment the removing of the contaminant from the spent sorbent in the reactivation zone is performed by introducing the spent sorbent into the top part of the reactivation zone and allowing the spent sorbent to fall to the bottom of the reactivation zone, by introducing the second gas stream into the bottom part of the reactivation zone and flowing the second gas stream upwards through the falling spent sorbent, by removing the separated reactivated sorbent from the bottom part of the reactivation zone, and, by removing the combustion gas from the top part of the reactivation zone.

In still another embodiment the removing of the contaminant from the spent sorbent in the reactivation zone is performed without oxidizing a detrimental amount of the sorbent portion of the spent sorbent.

The is also provided by the principles of this invention a closed loop process, which can be continuously operated for long periods of time, for cleaning contaminated main gas stream with an activated sorbent, reactivating spent sorbent, and combusting the contaminant. In this embodiment two sorption zones are used in alternating order so that as one sorption zone is being used to clean the contaminated main gas stream the other sorption zone is being reactivated. The flow of the main gas stream is switched from one sorption zone to the other sorption zone without interruption of the flow of the main gas stream. Accordingly in this embodiment the main gas stream is cleaned continuously. The process comprises providing a first and a second sorption zone each containing an activated sorbent. Introducing a main gas stream containing a contaminant into the first sorption zone and sorbing the contaminant on the activated sorbent contained therein. After the activated sorbent in the first sorption zone becomes spent, switching the flow of the contaminated main gas stream to the second sorption zone and sorbing the contaminant on activated sorbent contained therein.

The spent sorbent in the first sorption zone is then conveyed to a reactivation zone wherein it is heated to a first predetermined elevated temperature. The contaminant is removed or stripped from the spent sorbent by introducing a second gas stream into the reactivation zone thereby producing an reactivated sorbent and a contaminant laden gas stream. The contaminant laden gas stream is separated from the reactivated sorbent, and the separated reactivated sorbent is conveyed to a reactivated sorbent storage zone.

The separated contaminant laden gas stream is heated in the presence of oxygen in a combustion zone to a second predetermined temperature operable for combusting the contaminant thereby forming a combustion gas. The combustion gas is cooled to a third predetermined temperature and its relative humidity is adjusted to a value less than 50%. The combustion gas is then contacted with the activated sorbent in the sorption zone presently being used to treat the main gas stream. The cleaned combustion gas and the cleaned main gas stream are vented from the sorption zone.

In one embodiment the process further comprises conveying the separated reactivated sorbent from the reactivated sorbent storage zone to the sorption zone not being immediately used for removing contaminant from the main gas stream. The process further comprises, after the activated sorbent in one of the sorption zones becomes spent, switching the flow of the contaminated main gas stream to the other one of the sorption zones, and, repeating the process for reactivating the spent sorbent.

In one embodiment the conveying of spent sorbent from the sorption zones to the reactivation zone is performed in an enclosed conduit, the conveying the separated reactivated sorbent to the reactivated sorbent storage zone is performed in an enclosed conduit, and, the conveying of the reactivated sorbent from the reactivated sorbent storage zone to the sorption zones is performed in an enclosed conduit. In another embodiment the conveying of spent sorbent from the sorption zones to the reactivation zone comprises conveying of spent sorbent from the sorption zones to a spent sorbent storage zone, and conveying the spent sorbent from the spent sorbent storage zone to the reactivation zone continuously at a predetermined flow rate. In still another embodiment the conveying of spent sorbent from the sorption zones to the spent sorbent storage zone is performed in an enclosed conduit, and the conveying the spent sorbent from the spent sorbent storage zone to the reactivation zone is performed in an enclosed conduit.

In all embodiments of this invention the activated sorbent can be activated carbon, the activated carbon can be granular or pelletized.

There is also provided by the principles of this invention a apparatus for cleaning contaminated gas comprising a first and a second sorption chamber. Each sorption chamber has a gas inlet, a gas outlet, sorbent retaining means for holding a solid sorbent in a sorbent section within the sorption chamber so that gas flowing into the gas inlet must flow through solid sorbent contained therein, sorbent inlet means for charging solid sorbent into the sorption chamber and into the sorbent section, and sorbent outlet means for removing spent solid sorbent from the sorbent section and from the sorption chamber. Filtration apparatuses for filtering air are disclosed in U.S. Pat. No. 4,969,936 which is hereby incorporated herein by reference.

The apparatus also comprises sorbent reactivation means for reactivating spent solid sorbent. The sorbent reactivation means has sorbent inlet means for charging spent solid sorbent into the sorbent reactivation means, a gas inlet for introducing a purge gas into the sorbent reactivation means for removing contaminant from the spent solid sorbent, heating means for heating spent solid sorbent in the sorbent reactivation means, separating means for separating the contaminated purge gas from the reactivated solid sorbent, sorbent outlet means for removing reactivated solid sorbent from the separating means and from the sorbent retaining means, and a gas outlet for removing contaminated gas from the separating means and from the sorbent reactivation means. Methods and apparatus useful for reactivating spent carbon sorbent are disclosed in U.S. Pat. Nos. 4,374,092 and 4,455,282 which are both hereby incorporated herein by reference.

The apparatus includes conveying means for conveying spent solid sorbent from the sorbent outlet means of each of the sorption chambers to the sorbent inlet means of the sorbent reactivation means. The apparatus also comprises contaminant burner means for burning contaminant in the purge gas. The contaminant burner means has a gas inlet for introducing contaminant gas into the contaminant burner means, a gas outlet for removing combustion gas from the contaminant burner means, and heating means for heating purge gas in the contaminant burner means.

The apparatus further comprises a conduit for conveying contaminated purge gas from the gas outlet of the sorbent reactivation means to the gas inlet of the contaminant burner means, cooling means for cooling combustion gas, and a conduit for conveying combustion gas from the gas outlet of the contaminant burner means to the gas cooling means.

The apparatus includes humidity adjusting means for adjusting the relative humidity of the combustion gas from the cooling means, a conduit for conveying the combustion gas from the cooling means to the humidity adjusting means, a conduit for conveying combustion gas from the humidity adjusting means to the gas inlet of the sorption chambers, and conveying means for conveying reactivated solid sorbent from the sorbent outlet means of the sorbent reactivation means to the sorption chambers.

In one embodiment the apparatus further comprises storage means for storing activated solid sorbent, conveying means for conveying solid sorbent from the storage means to the sorbent inlet means of the sorption chambers, and conveying means for conveying reactivated solid sorbent from the sorbent outlet means of the sorbent reactivation means to the reactivated sorbent storage means.

In another embodiment the apparatus further comprises a spent sorbent storage means for storing spent solid sorbent, conveying means for conveying spent solid sorbent from the sorbent outlet means of each of the sorption chambers to the spent sorbent storage means and conveying means for conveying spent solid sorbent from the spent sorbent storage means to the sorbent inlet means of the sorbent reactivation means.

In still another embodiment the apparatus also comprises first scrubbing means for scrubbing the combustion gas, a conduit for conveying combustion gas from the gas cooling means to the first scrubbing means, second scrubbing means for scrubbing the combustion gas from the first scrubbing means, a conduit for conveying combustion gas from the first scrubbing means to the second scrubbing means.

In yet another embodiment the humidity adjusting means comprises cooling means for cooling combustion gas and forming a water condensate, separating means for separating the water condensate from the combustion gas, heater means for heating the separated combustion gas, and a conduit for conveying combustion gas from the second scrubbing means to the humidity adjusting means.

DESCRIPTION OF THE PREFERRED EMBODIMENTS

Figure 1:
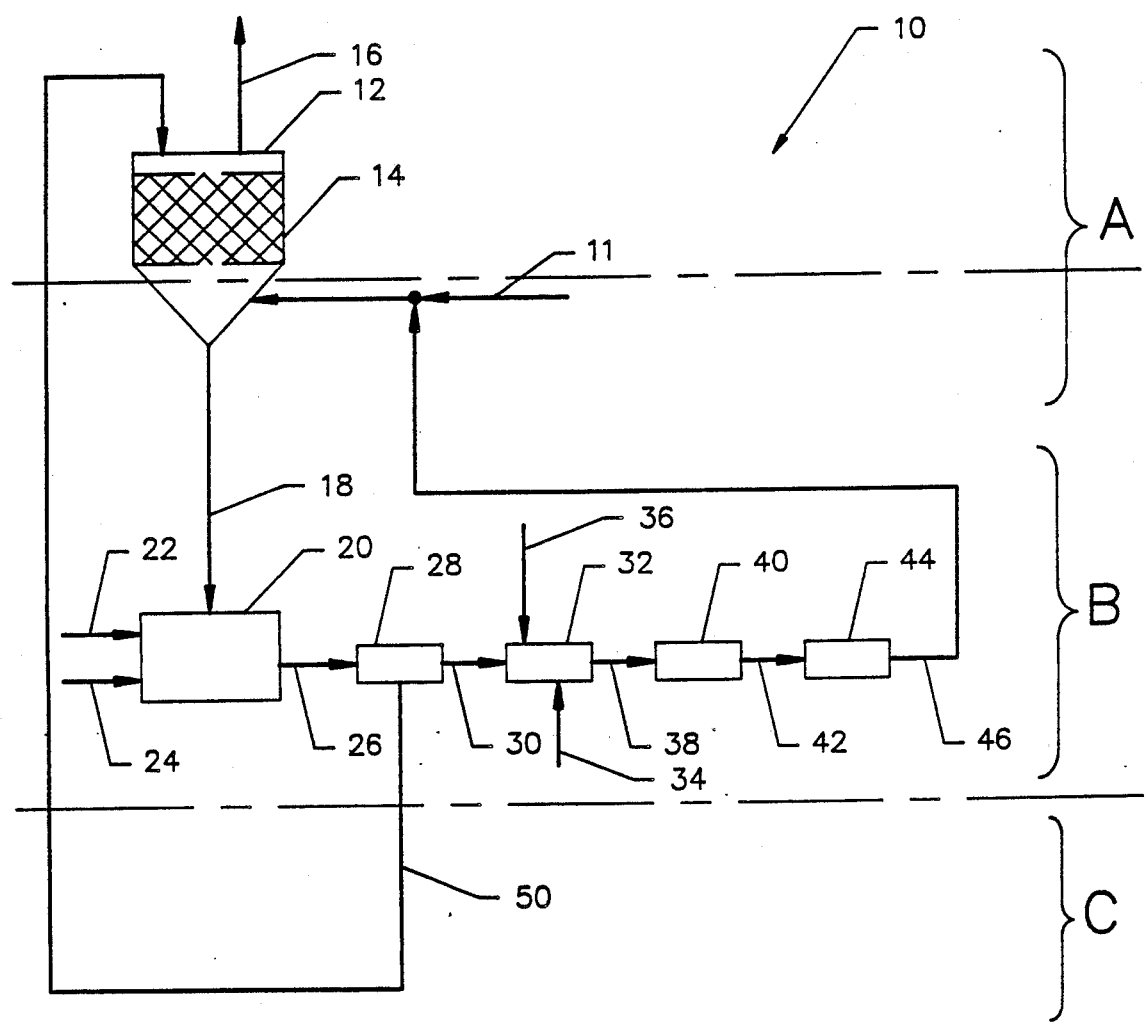
FIG. 1 is a flow diagram of a basic closed loop system for on-site reactivation of spent sorbent.

FIG. 1 illustrates the basic embodiment of this invention for a process for cleaning a contaminated main gas stream, generally designated by numeral 10, in which in the initial phase or Phase A, designated by the letter "A" in FIG. 1, begins with the introduction of a contaminated main gas stream through line 11 into sorption zone 12 which contains activated carbon sorbent 14. Sorption of the contaminant in the main gas stream by the activated carbon sorbent produces a cleaned main gas stream which is suitable for venting to the environment through vent 16. Sorption of the contaminant on the activated carbon sorbent is continued until the activated carbon sorbent sorbs a predetermined amount of contaminant thereby forming a spent sorbent whereupon the flow of the main gas stream into the sorption zone is stopped and the next phase or Phase B, designated by the letter "B" in FIG. 1, starts.

Phase B begins by conveying the spent sorbent through conduit 18 to reactivation zone 20, recharging the sorption zone with additional activated carbon sorbent, and recommencing the flow of the main gas stream into sorption zone 12. In reactivation zone 20 the spent sorbent is heated by heating means 22 to a predetermined elevated temperature and purged or stripped of contaminant with a gas stream, sometimes referred to herein as the second gas stream or purge gas, which is introduced into the reactivation zone through line 24. The predetermined elevated temperature of the reactivation zone is controlled by heating means 22 to usually between about 500° C. and about 700° C. Heating means 22 is an indirect source of heat which does not add additional gas to the reactivation zone or process, which is important for reasons which will be explained more fully later. A non-limiting example of heating means 22 is electrical heating. The predetermined elevated temperature in reactivation zone 20 is high enough to volatilize and drive the contaminant from the spent sorbent whereupon the contaminant becomes mixed with the purge gas or second gas stream. Under the conditions employed in the reactivation zone, the purge gas is non-deleteriously reactive with the greater part of the matrix carbon content of the sorbent. By the expression "the greater part of the matrix carbon content of the sorbent" as used herein is meant that at least about 85% of the matrix carbon of the spent sorbent remains in the activated sorbent. Non-limiting examples of such non-deleteriously reactive purge gas are air, steam, carbon dioxide, nitrogen and mixtures thereof. In general the amount of purge gas is controlled so that it does not increase the total amount of gases in the reactivation zone beyond a predetermined amount as will be explained more fully later.

The reactivated carbon sorbent and purge gas containing the contaminant is conveyed through means 26 to separation zone 28 whereupon the contaminant laden gas stream is separated from the reactivated carbon sorbent. The separated contaminant laden gas stream is removed from the separation zone through line 30 and introduced into contaminant burner zone 32 which is heated to a second predetermined temperature by heating means 34 whereupon the contaminant is combusted with oxygen. Heating means 34 can be any source of indirect heat which does not add additional gas to the contaminant burner zone or process. A non-limiting example of a indirect heating means is electrical heating. The second predetermined temperature of the contaminant burner zone is controlled by heating means 34 to usually between about 800° C. and about 1000° C. The oxygen or oxygen-containing stream is introduced into the process either through conduit 36 or as part of the purge gas introduced into reactivation zone 20 through line 24. Regardless of where the oxygen or oxygen-containing stream is introduced into the process, the combined purge gas and oxygen-containing gas is controlled so that such combined flow is no greater than about 50% of the incoming flow of main gas stream to the sorption zone or process. By controlling the combined flow of purge gas and oxygen-containing stream so that it does not exceed 50% of the main gas stream, the combustion gas from the contaminant burner zone can be cleaned and vented with the cleaned main gas stream in a closed loop process wherein all vented streams are first cleaned by activated carbon sorbent before being vented as will be more fully explained.

The combustion gas is removed from the contaminant burner zone through line 38 and introduced into cooling zone 40 whereupon the combustion gas is cooled to a predetermined temperature between about 50° C. and about 150° C. The cooled combustion gas is removed from cooling zone 40 by means 42 and introduced into humidity adjusting zone 44 whereupon the relative humidity of the combustion gas is adjusted so that its relative humidity is less than 50%. The humidity adjusted combustion gas is removed from zone 44 through line 46 and introduced into sorption zone 12 along with the main gas stream.

In the next phase or Phase C, designated by the letter "C" in FIG. 1, the flow of the main gas stream to sorption zone 12 is stopped and the reactivated carbon sorbent from separation zone 28 is conveyed through conduit 50 to sorption zone 12 whereupon the reactivated carbon sorbent serves as the source of activated carbon sorbent used to recharge sorption zone 12 after the spent sorbent has been removed therefrom. Thereafter the flow of the main gas stream to sorption zone 12 is resumed and the process continued as described above.

Figure 2:
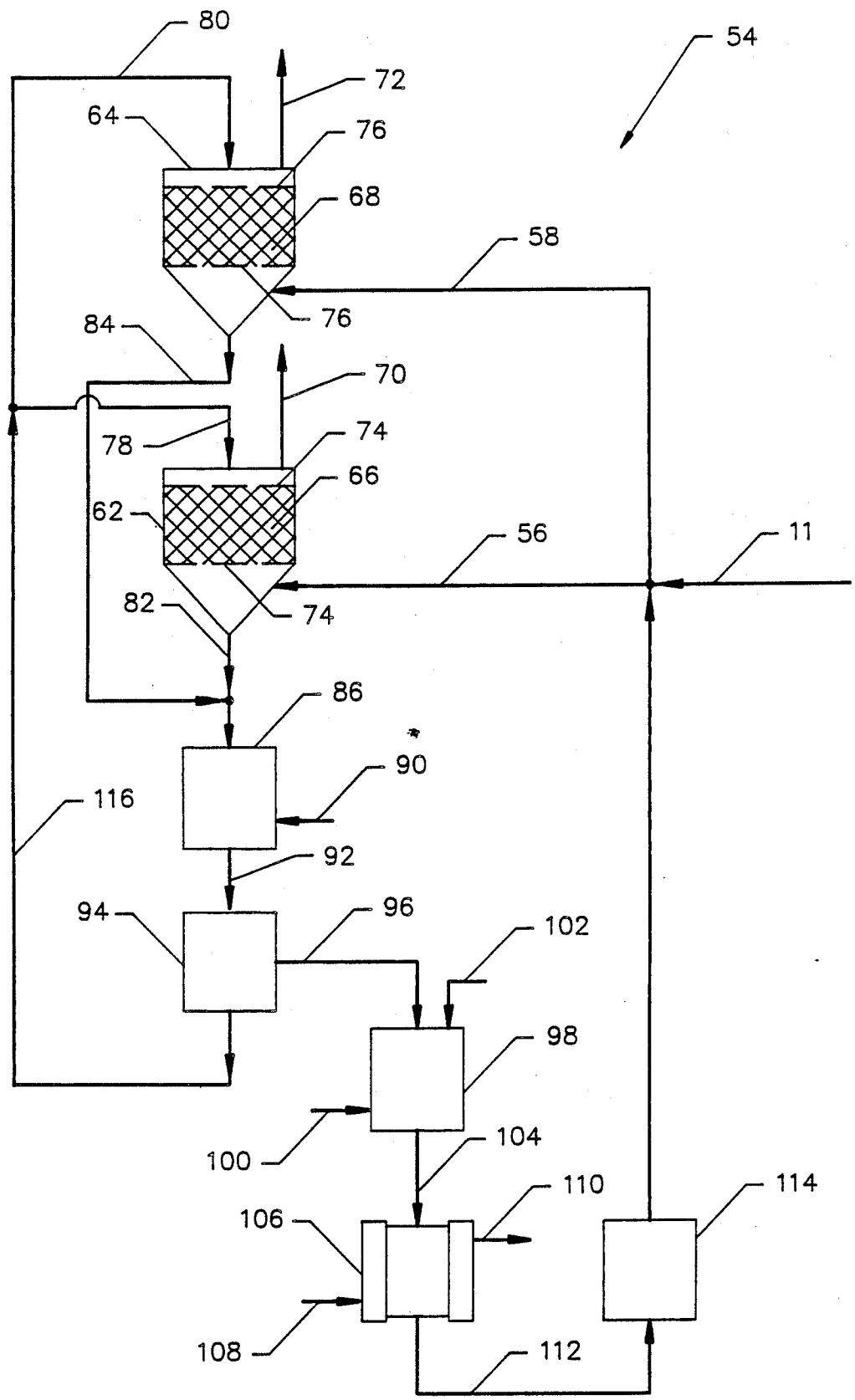
FIG. 2 is a flow diagram of a closed loop system having two sorption zones for the continuous on-site sorption of contaminants from a main gas stream with reactivation of spent sorbent.

FIG. 2 illustrates another embodiment of this invention for a apparatus for cleaning a contaminated main gas stream, generally designated by numeral 54, in which a contaminated main gas stream flows through line 11 into one of two lines 56 and 58, and then into one of two sorption chambers 62 and 64 each of which contain activated carbon sorbent 66 and 68, each sorption chamber having gas outlets or vents 70 and 72, sorbent retaining means 74 and 76, sorbent inlet means 78 and 80, and sorbent outlet means 82 and 84. In the initial phase or Phase A the main gas stream is directed to the first sorption chamber 62 whereupon the contaminant in the main gas stream is sorbed by activated carbon sorbent 66 and a cleaned main gas stream is produced which si suitable for venting to the environment through vent 70. Sorption of the contaminant on the activated carbon sorbent in the first sorption chamber 62 is continued until the sorbent 66 sorbs a predetermined amount of contaminant thereby forming a spent sorbent whereupon the flow of the main gas stream into the first sorption chamber 62 is stopped and the next phase of Phase B starts.

Phase B begins by switching the flow of the main gas stream into second sorption chamber 64 whereupon the contaminant is sorbed on sorbent 68 in the manner described for sorbent 66 in the first sorption chamber. In the meantime, the spent sorbent in the first sorption chamber 62 is conveyed through conduit 82 to sorbent reactivation means 86. In sorbent reactivation means 86 the spent sorbent is heated by heating means 88 to a predetermined elevated temperature and purged or stripped of contaminant with a gas stream, sometimes referred to herein as the second gas stream or purge gas, which is introduced into the sorbent reactivation means 86 through line 90. The predetermined elevated temperature of the reactivation means is controlled by heating means 88 to usually between about 500° C. and about 700° C. Heating means 88 is an indirect source of heat which does not add additional gas to the reactivation means or system. The predetermined elevated temperature in sorbent reactivation means 86 is high enough to volatilize and drive the contaminant from the spent sorbent whereupon the contaminant becomes mixed with the purge gas or second gas stream which has been introduced into the sorbent reactivation means 86 through line 90. Under the conditions employed in the sorbent reactivation means 86, the purge gas is non-deleteriously reactive with the greater part of the matrix carbon content of the sorbent, that is the greater part of the matrix carbon content of the sorbent remains in and with the reactivated carbon sorbent. Non-limiting examples of preferred purge gases are air, steam and mixtures thereof. In general the amount of purge gas is controlled so that it does not increase the total amount of gases in the reactivation means beyond a predetermined amount.

The reactivated carbon sorbent and purge gas containing the contaminant is conveyed through means 92 to gas/solid separation means 94 whereupon the contaminant laden gas stream is separated from the reactivated carbon sorbent. The separated contaminant laden gas stream is removed from the separation section through line 96 and introduced into contaminant burner means 98 which is heated to a second predetermined temperature by heating means 100 whereupon the contaminant in the contaminant laden gas stream is combusted in contaminant burner means 98 with oxygen. Heating means 100 can be any source of indirect heat which does not add additional gas to the contaminant burner means or elsewhere in the apparatus. A non-limiting example of a indirect heating means is electrical heating. The second predetermined temperature of the contaminant burner means is controlled by heating means 100 to usually between about 800° C. and about 1000° C. The oxygen or oxygen-containing stream is introduced into the apparatus either through line 102, or as part of the purge gas introduced into sorbent reactivation means 86 through line 90. Regardless of where the oxygen or oxygen-containing stream is introduced into the apparatus, i.e. at lines 90 or 102 or elsewhere, the combined purge gas and oxygen-containing gas flow is controlled so that such combined flow is no greater than about 50% of the incoming flow of main gas stream to the on-line sorption chamber 62 or 64. By controlling the combined flow of purge gas and oxygen-containing stream so that it does not exceed 50% of the main gas stream, the combustion gas from the contaminant burner means can be cleaned and vented with the cleaned main gas stream in the closed loop provided by the apparatus of this invention so that all vented streams which at any time contained contaminant are ultimately cleaned by contact with the activated carbon sorbent in the on-line sorption chamber 62 or 64 before such gas streams are vented as will be more fully explained.

The combustion gas is removed from the contaminant burner means 98 through line 104 and introduced into heat exchanger 106 which provides cooling means for cooling the combustion gas to a predetermined temperature between about 50° C. and about 150° C. Coolant, for example water or air, enters heat exchanger 106 through line 108 and exits through line 110. The cooled combustion gas is removed from heat exchanger 106 by line 112 and introduced into humidity adjusting unit 114 whereupon the relative humidity of the combustion gas is adjusted so that its relative humidity is less than 50%. The humidity adjusted combustion gas is removed from unit 114 through conduit 116 and returned to sorption chamber 64 along with the main gas stream whereupon any contaminant remaining in the combustion gas is removed by sorption in the on-line sorption chamber.

After all the spent sorbent as been removed from the first sorption chamber 62, the reactivated carbon sorbent from separation means 94 is conveyed through conduit 116 to sorption chamber 62 whereupon the reactivated carbon sorbent serves as the source of activated carbon sorbent for the next phase.

In the next phase or Phase C, when sorbent 68 becomes contaminated a predetermined amount, the flow of the main gas stream to sorption chamber 64 is switched back to sorption chamber 62 which has been recharged with reactivated solid sorbent, and the process continued as described above. Therefore it can be seen that the apparatus provides means for the continuous sorption of contaminant from a main gas stream on an activated sorbent in one of the sorption chambers 62 and 64 while providing also for the reactivation of the spent sorbent from the other sorption chamber, combustion of the contaminant and sorption of any remaining contaminant in the combustion gas on activated sorbent in the on-line sorption chamber. The apparatus therefore provides means for cleaning all vented gas streams which at any time in their history contained contaminant before venting such gas streams to the environment thereby providing a closed loop system which reactivates the sorbent at the site of its usage thereby eliminating the hauling or trucking of spent sorbent from the site of its usage to distant locations for reactivation.

Figure 3:
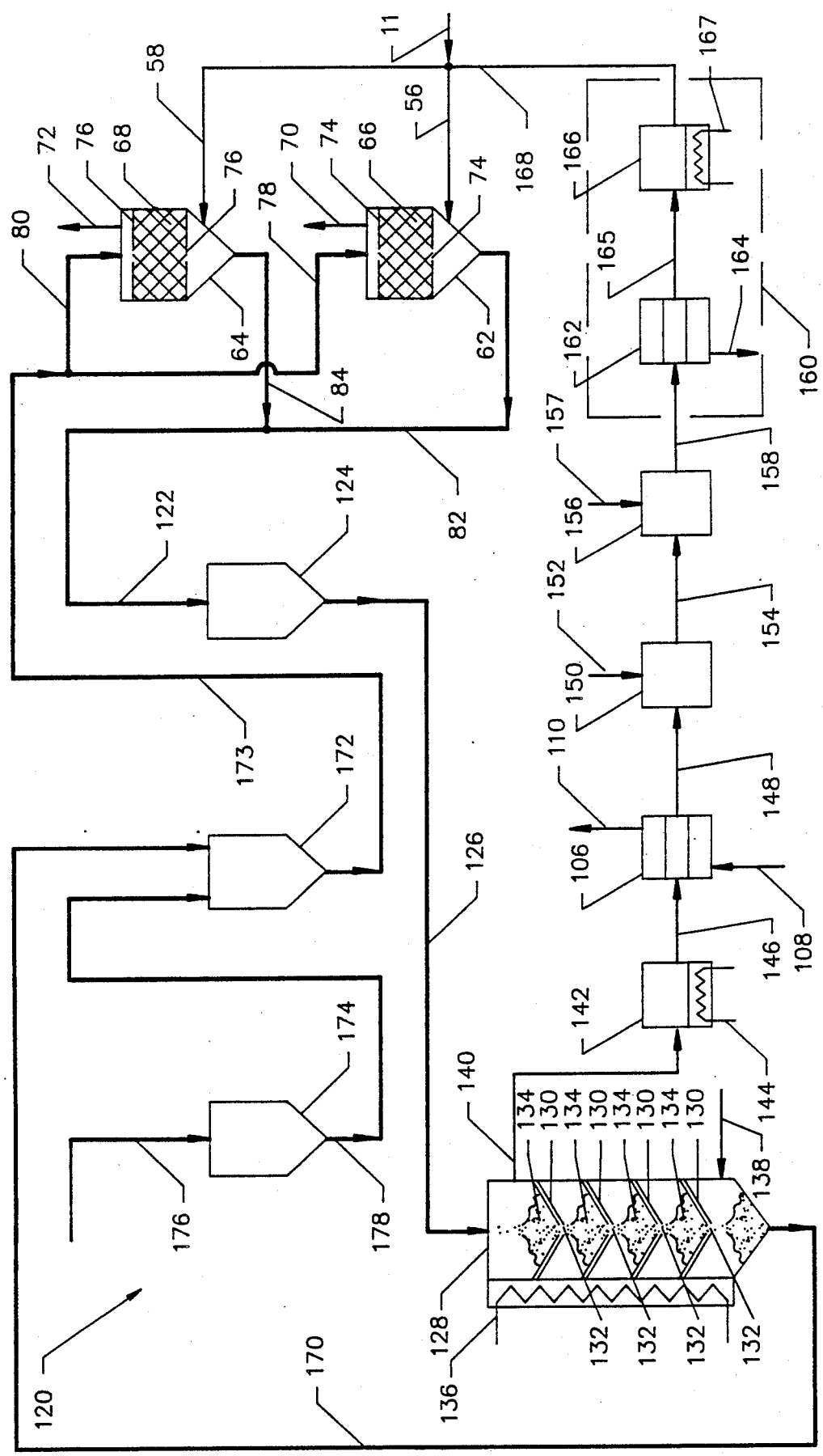
FIG. 3 is a flow diagram of a closed loop system of FIG. 2 with units for scrubbing the combustion gas prior to treating the combustion gas in the sorption zones.

FIG. 3 illustrates still another embodiment of this invention for a system for cleaning a contaminated main gas stream, generally designated by numeral 120, in which a contaminated main gas stream flows through line 11 into one of two lines 56 and 58 and then into one of two sorption chambers 62 and 64 each of which contain activated carbon sorbent 66 and 68, each sorption chamber having gas outlets or vents 70 and 72, sorbent retaining means 74 and 76, sorbent inlet means 78 and 80, and sorbent outlet means 82 and 84. In the initial phase or Phase A the main gas stream is directed to the first sorption chamber 62 whereupon the contaminant in the main gas stream is sorbed by activated carbon sorbent 66 and a cleaned main gas stream is produced which is suitable for venting to the environment through vent 70. Sorption of the contaminant on the activated carbon sorbent in the first sorption chamber 62 is continued until the sorbent 66 sorbs a predetermined amount of contaminant thereby forming a spent sorbent whereupon the flow of the main gas stream into the first sorption chamber 62 is stopped and the next phase or Phase B starts.

Phase B begins by switching the flow of the main gas stream into second sorption chamber 64 whereupon the contaminant is sorbed on sorbent 68 in the manner described for sorbent 66 in the first sorption chamber. In the meantime, the spent sorbent in the first sorption chamber 62 is conveyed through line 82 to manifold conduit 122 and then to spent sorbent storage hopper 124. The spent solid sorbent is continuously fed through conduit 126 into the top part of sorbent reactivation unit 128 whereupon the spent solid sorbent falls by gravity through a plurality of conical shaped trays 130 arranged one over the other inside of unit 128. The spent solid sorbent falls through the openings 132 in trays 130 to the bottom of unit 128 forming a plurality of beds 134 of spent solid sorbent on trays 130. In unit 128 the spent sorbent is heated by electrical heating element 136 to a predetermined elevated temperature and purged or stripped of contaminant with a gas stream, sometimes referred to herein as the second gas stream or purge gas, introduced into the bottom part of unit 128 through line 138. The predetermined elevated temperature of the reactivation means is controlled by heating elements 136 to usually between about 500° C. and about 700° C. It is to be noted that heating element 136 is an indirect source of heat which does not add additional gas to the reactivation means or system. The purge gas in combination with the predetermined elevated temperature in sorbent reactivation unit 128 is high enough to volatilize and drive the contaminant from the spent sorbent whereupon the contaminant becomes mixed with the purge gas or second gas stream which has been introduced into through line 138. Under the conditions employed in unit 128, the purge gas is non-deleteriously reactive with the greater part of the matrix carbon content of the sorbent, that is the greater part of the matrix carbon content of the sorbent remains in and with the reactivated carbon sorbent. The preferred purge gas is a mixture of air and steam. In general the amount of purge gas is controlled so that it does not increase the total amount of gases in the reactivation means beyond a predetermined amount. The purge gas flows upward through the several beds 134 of solid sorbent on trays 130 and countercurrent to the flow of solid sorbent while removing contaminant from the spent solid sorbent during the purge gas upward flow. Unit 128 therefore also serves as a gas/solid separation device in which the contaminant laden gas stream is separated from the reactivated carbon sorbent. At the top part of unit 128 the separated contaminant laden gas stream is removed from the separation section through line 140 and introduced into contaminant burner unit 142 which is heated to a second predetermined temperature by electrical heating element 144 whereupon the contaminant in the contaminant laden gas stream is combusted in contaminant burner unit 142 with the oxygen in the purge gas introduced into sorbent reactivation unit 128 through line 138. It is to be noted that heating element 144 also does not add additional gas to the system. The predetermined temperature of the spent solid sorbent in unit 142 is controlled by heating element 144 to usually between about 800° C. and about 1000° C. The flow of oxygen-containing purge gas is controlled so that such flow is no greater than about 50% of the incoming flow of main gas stream to the on-line sorption chamber 62 or 64. By controlling the flow of oxygen-containing purge gas so that it does not exceed 50% of the main gas stream, the combustion gas from contaminant burner unit 142 can be simultaneously cleaned with the main gas stream using the activated sorbent in the on-line sorption chamber. The thusly cleaned combustion gas is vented with the cleaned main gas stream.

The combustion gas is removed from the contaminant burner unit 142 through line 146 and introduced into heat exchanger 106 which provides cooling means for cooling the combustion gas to a predetermined temperature generally between about 50° C. and about 150° C. Coolant, for example water or air, enters heat exchanger 106 through line 108 and exits through line 110. The cooled combustion gas is removed from heat exchanger 106 through line 148 and introduced into scrubbing unit 150, sometimes referred to herein as the first scrubbing means, wherein the combustion gas is scrubbed with a dilute caustic solution introduced through line 152. The major part of the chlorine-containing gaseous components, sulfur oxides and nitrogen oxides are removed from the combustion gas in scrubbing unit 150. The combustion gas is removed from unit 150 through line 154 and introduced into second scrubbing unit 156. In unit 156 the small remaining part of the chlorine-containing gaseous components, sulfur oxides and nitrogen oxides which are not removed in unit 150 are removed from the combustion gas in unit 156 wherein the combustion gas is scrubbed with a dilute caustic solution introduced through line 157 thereby producing a scrubbed combustion gas which is substantially free of chlorine-containing gaseous components, sulfur oxides and nitrogen oxides. The scrubbed combustion gas is removed from the second scrubbing unit 156 through line 158 and introduced into humidity adjusting subsystem 160 in which the relative humidity of the combustion gas is adjusted so that its relative humidity is less than 50%. Humidity adjusting subsystem 160 comprises condenser 162 for cooling the scrubbed combustion gas to about 25° C. thereby causing water vapor to condense, condensate removal means connected to condensate line 164, and outlet line 165 to heater 166 which comprises heating element 167 for heating the scrubbed combustion gas from condenser 162 to about 50° C. thereby providing a partly dried combustion gas. The humidity adjusted or partly dried combustion gas is removed from subsystem 160 through line 168 and returned to sorption chamber 64 along with the main gas stream whereupon any contaminant remaining in the combustion gas is removed by sorption in the on-line sorption chamber.

The reactivated carbon sorbent from sorbent reactivation unit 128 is conveyed through conduit 170 to reactivated sorbent storage hopper 172. After all the spent sorbent as been removed from the first sorption chamber 62 and stored in hopper 124, the reactivated solid sorbent is conveyed from hopper 172 through conduit 173 to sorbent inlet means 80 which serves to charge reactivated carbon sorbent into sorption chamber 62 whereupon the reactivated carbon sorbent serves as the source of activated carbon sorbent for the next phase.

In the next phase of Phase C, when sorbent 68 becomes contaminated a predetermined amount, the flow of the main gas stream to sorption chamber 64 is switched back to sorption chamber 62 which has now been recharged with reactivated solid sorbent, and the process continued as described above. Because a small amount of the carbon matrix of the spent solid sorbent is lost in units 128 and 142 due to oxidation and the water gas reaction, a small quantity of replacement activated carbon will be required. Replacement activated carbon is charged to hopper 174 through conduit 176 and conveyed from hopper 174 to hopper 172 through conduit 178. Therefore it can be seen that the apparatus provides means for the continuous sorption of contaminant from a main gas stream on an activated sorbent in one of a pair of sorption chambers, desorption and combustion of the contaminant, scrubbing of chlorine-containing gaseous components, sulfur oxides and nitrogen oxides from the combustion gas, adjusting the relative humidity of the scrubbed combustion gas by drying, and sorption of any remaining small amount of contaminant in the dried combustion gas on activated sorbent in the on-line sorption chamber. This invention therefore provides a relatively compact closed loop system which does not over load a pair sorption chambers and which essentially completely removes contaminant from a main gas stream thereby enabling the venting of an environmentally safe gas while simultaneously reactivating the spent solid sorbent and oxidizing contaminants in a closed loop system which is coupled to sorption chambers.

In one embodiment the means for conveying solid sorbent in conduits 82, 84, 122, 170 and 178 of FIG. 3 is pneumatic, while in conduits 78, 80, 126 and 173 solids are fed by gravity, and conduit 176 to hopper 174 is bulk fed from bags of activated carbon.

EXAMPLE

A hood in a paint spray facility entrains in an air flow of 20,000CFM the following volatile organic contaminants:

isopropyl alcohol referred to herein as "C1"
xylene referred to herein as "C2"

toluene referred to herein as "C3"
trichloroacetic acid or TCA referred to herein as "C4".

Oxidation of the contaminants produces the following additional contaminants:
carbon dioxide referred to herein as "C5"
hydrochloric acid referred to herein as "C6".

Other abbreviations referred to herein are:
"GAC"—for granular activated carbon
"S"—for sorbent or GAC flow rate
"G"—for gas flow rate
"T"—for temperature
"H"—for heat input.

Using the system depicted in FIG. 3 for the treatment of the spray booth hood exhaust, the gas, contaminants and GAC flow rates, temperature and heat input at several location sin the process, identified by element no., are as follows:

```
Element No. = 11
    G = 20,000 CFM
    T = 25° C.
    C1 = 19.54 lb/day
    C2 = 2.24 lb/day
    C3 = 3.56 lb/day
    C4 = 106.60 lb/day
Element No. = 56 or 58
    G = 20,050 CFM
    T = 25° C.
    C1 = 19.541 lb/day
    C2 = 2.258 lb/day
    C3 = 3.561 lb/day
    C4 = 106.633 lb/day
Element No. = 70 or 72
    G = 20,050 CFM
    T = 25° C.
    C1 = not detected
    C2 = not detected
    C3 = not detected
    C4 = not detected
Element No. = 122
    S = 2113.11 GAC/day
    T = 25° C.
    C1 = 0.016 lb/day
    C2 = 0.075 lb/day
    C3 = 0.004 lb/day
    C4 = 0.136 lb/day
Element No. = 126
    S = 100 lb GAC/hr
    T = 25° C.
    C1 = 0.016 lb/day
    C2 = 0.075 lb/day
    C3 = 0.004 lb/day
    C4 = 0.136 lb/day
Element No. = 170
    S = 95 lb GAC/hr
    T = 25° C.
    C1 = not detected
    C2 = not detected
    C3 = not detected
    C4 = not detected
Element No. = 78 or 80
    S = 2113.11 lb GAC/hr
    T = 25° C.
    C1 = not detected
    C2 = not detected
    C3 = not detected
    C4 = not detected
Element No. = 178
    S = 5 lb GAC/hr
    T = 25° C.
    C1 = not detected
    C2 = not detected
    C3 = not detected
    C4 = not detected
Element No. = 138
    G = 50 CFM
    T = 25° C.
    C1 = not detected
    C2 = not detected
    C3 = not detected
    C4 = not detected
Element No. = 140
    G = 168.77 CFM
    T = 648.2° C.
    C1 = 38.40 lb/day
    C2 = 180.00 lb/day
    C3 = 9.60 lb/day
    C4 = 326.40 lb/day
Element No. = 144
    H = 16 kw
Element No. = 146
    G = 168.77 CFM
    T = 648.2° C.
    C1 = 0.0040 lb/day
    C2 = 0.0180 lb/day
    C3 = 0.0010 lb/day
    C4 = 0.0330 lb/day
    C5 = 838.8000 lb/day
    C6 = 271.8000 lb/day
Element No. = 148
    G = 50 CFM
    T = 25° C.
    C1 = 0.0040 lb/day
    C2 = 0.0180 lb/day
    C3 = 0.0010 lb/day
    C4 = 0.0330 lb/day
    C5 = 838.8000 lb/day
    C6 = 271.8000 lb/day
Element No. = 154
    G = 50 CFM
    T = 25° C.
    C1 = 0.0040 lb/day
    C2 = 0.0180 lb/day
    C3 = 0.0010 lb/day
    C4 = 0.0330 lb/day
    C5 = 0.8390 lb/day
    C6 = 0.2720 lb/day
Element No. = 158
    G = 50 CFM
    T = 25° C.
    C1 = 0.0040 lb/day
    C2 = 0.0180 lb/day
    C3 = 0.0010 lb/day
    C4 = 0.0330 lb/day
    C5 = 0.0420 lb/day
    C6 = 0.0140 lb/day
Element No. = 165
    G = 50 CFM
    T = 15° C.
    C1 = 0.0040 lb/day
    C2 = 0.0180 lb/day
    C3 = 0.0010 lb/day
    C4 = 0.0330 lb/day
    C5 = 0.0420 lb/day
    C6 = 0.0140 lb/day
Element No. = 167
    H = 0.3 kw
Element No. = 168
    G = 50 CFM
    T = 25° C.
    C1 = 0.0040 lb/day
    C2 = 0.0180 lb/day
    C3 = 0.0010 lb/day
    C4 = 0.0330 lb/day
    C5 = 0.0420 lb/day
    C6 = 0.0140 lb/day
```

While the preferred embodiment so the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A closed loop process for cleaning contaminated main gas stream with activated sorbent, reactivating spent sorbent, and combusting the contaminant comprising:
   (a) beginning a phase by introducing a main gas stream containing a contaminant into a sorption zone and sorbing the contaminant on activated sorbent contained therein thereby producing a cleaned main gas stream;
   (b) after the activated sorbent in the sorption zone sorbs a predetermined amount of the contaminant thereby forming a spent sorbent, stopping the introduction of the contaminated main gas stream into the sorption zone;
   (c) beginning the next phase by conveying the spent sorbent which contains the contaminant sorbed thereon from the sorption zone to a reactivation zone;
   (d) recharging activated sorbent to the sorption zone and resuming introducing the main gas stream containing the contaminant to the sorption zone;
   (e) heating the spent sorbent in the reactivation zone to a first predetermined elevated temperature and removing the contaminant from the spent sorbent with a second gas stream thereby producing an reactivated sorbent and a contaminant laden gas stream;
   (f) separating the contaminant laden gas stream from the reactivated sorbent;
   (g) heating the separated contaminant laden gas stream in the presence of oxygen in a combustion zone to a second predetermined temperature operable for combusting the contaminant thereby forming a combustion gas, the amount of oxygen being sufficient to oxidize the contaminant in the contaminant laden gas stream, the combined flow of the second gas stream and the oxygen being no greater than about 50% of the flow of the main gas stream, the second predetermined temperature being higher than the first predetermined elevated temperature;
   (h) cooling the combustion gas to a third predetermined temperature; thereafter
   (i) adjusting the relative humidity of the combustion gas so that it has a relative humidity less than 50%; thereafter
   (j) contacting the combustion gas with the activated sorbent in the sorption zone to remove undesirable components in the combustion gas thereby forming a cleaned combustion gas suitable for venting;
   (k) venting the cleaned combustion gas and the cleaned main gas stream from the sorption zone; and
   (l) after the activated sorbent in the sorption zone sorbs the predetermined amount of the contaminant thereby forming additional spent sorbent, stopping the introduction of the contaminated main gas stream into the sorption zone, then in the next phase repeating steps (c) through (k) and using the separated reactivated sorbent as the activated sorbent mentioned in step (d).

2. The process of claim 1, wherein the combined flow of the second gas stream and the oxygen is not greater than about 10% of the flow of the main gas stream.

3. The process of claim 1, wherein the combined flow of the second gas stream and the oxygen is no greater than about 11% of the flow of the main gas stream.

4. The process of claim 1, wherein the second gas stream is selected from the group consisting of air, steam, nitrogen, oxygen and mixtures thereof.

5. A closed loop process for cleaning contaminated main gas stream with activated carbon sorbent, reactivating spent sorbent, and combusting the contaminant comprising:
   (a) providing a first and a second sorption zone each containing an activated carbon sorbent;
   (b) introducing a main gas stream containing a contaminant into the first sorption zone and sorbing the contaminant on the activated carbon sorbent contained therein thereby producing a cleaned main gas stream;
   (c) after the activated carbon sorbent in the first sorption zone sorbs a predetermined amount of the contaminant thereby forming a spent carbon sorbent, switching the introduction of the contaminated main gas stream from into the first sorption zone to into the second sorption zone and sorbing the contaminant on activated carbon sorbent contained in the second sorption zone;
   (d) conveying the spent carbon sorbent which contains the contaminant sorbed thereon from the first sorption zone to a carbon reactivation zone;
   (e) heating the spent carbon sorbent in the carbon reactivation zone to a first predetermined elevated temperature;
   (f) controlling the flow rate of a second gas stream into the carbon reactivation zone and removing the contaminant from the spent carbon sorbent thereby producing an reactivated carbon sorbent and a contaminant laden gas stream;
   (g) separating the contaminant laden gas stream from the reactivated carbon sorbent;
   (h) conveying the separated reactivated carbon sorbent to a reactivated sorbent storage zone;
   (i) heating the separated contaminant laden gas stream in the presence of oxygen in a combustion zone to a second predetermined temperature operable for combusting the contaminant thereby forming a combustion gas, the amount of oxygen being sufficient to oxidize the contaminant in the contaminant laden gas stream, the combined flow of the second gas stream and the oxygen being no greater than about 50% of the flow of the main gas stream, the second predetermined temperature being higher than the first predetermined elevated temperature;
   (j) cooling the combustion gas to a third predetermined temperature; thereafter
   (k) adjusting the relative humidity of the combustion gas so that it has a relative humidity less than 50%; thereafter
   (l) contacting the combustion gas with the activated carbon sorbent in the sorption zone presently being used for sorbing the contaminant in the main gas stream, to remove undesirable components in the combustion gas thereby forming a cleaned combustion gas suitable for venting;

(m) venting the cleaned combustion gas and the cleaned main gas stream from the last mentioned sorption zone; and (n) conveying the reactivated carbon sorbent from the reactivated sorbent storage zone to the sorption zone not being immediately used for removing contaminant from the main gas stream.

6. The process of claim 5, wherein the combined flow of the second gas stream and the oxygen is no greater than about 10% of the flow of the main gas stream.

7. The process of claim 5, wherein the combined flow of the second gas stream and the oxygen is no greater than about 1% of the flow of the main gas stream.

8. The process of claim 5, wherein the first predetermined temperature is from about 500° C. to about 700° C., the second predetermined temperature is from about 800° C. to about 1000° C., and the third predetermined temperature is from about 50° C. to about 150° C.

9. The process of claim 5, wherein the second gas stream is selected from the group consisting of air, steam, nitrogen, oxygen and mixtures thereof.

10. The process of claim 5, wherein the second gas stream is selected from the group consisting of oxygen-containing gases, steam, and mixtures thereof.

11. The process of claim 5, wherein the second gas stream contains oxygen.

12. The process of claim 5, wherein the oxygen mentioned in step (i) is contained in the second gas stream.

13. The process of claim 5, wherein the amount of oxygen mentioned in step (i) is sufficient to oxidize at least about 95% of the contaminant in the contaminant laden gas stream.

14. The process of claim 5, wherein after cooling the combustion gas to a third predetermined temperature as mentioned in step (j), thereafter further comprising:
scrubbing the combustion gas with a scrubbing agent effective for removing a contaminant selected from the group consisting of chlorine containing gases, sulfur oxides, nitrogen oxides, carbon oxides and mixtures thereof; and
thereafter adjusting the relative humidity of the combustion gas as mentioned in step (k).

15. The process of claim 5, wherein after cooling the combustion gas to a third predetermined temperature as mentioned in step (j), thereafter further comprising:
scrubbing the cooled combustion gas in a first scrubbing zone with a scrubbing agent effective for removing carbon dioxide thereby producing a scrubbed combustion gas;
scrubbing the scrubbed combustion gas in a second scrubbing zone with a scrubbing agent effective for removing carbon dioxide; and
thereafter adjusting the relative humidity of the combustion gas as mentioned in step (k).

16. The process of claim 5, wherein the third predetermined temperature as mentioned in step (j) is low enough to condense water vapor in the combustion gas and form a condensate with the combustion gas; thereafter further comprising:
separating the condensate from the combustion gas; and
thereafter adjusting the relative humidity of the combustion gas as mentioned in step (k).

17. The process of claim 5, wherein the heating the spent carbon sorbent in the carbon reactivation zone to the first predetermined temperature is performed electrically.

18. The process of claim 5, wherein the second gas stream and the spent carbon sorbent flow countercurrently through the carbon reactivation zone.

19. The process of claim 5, wherein the removing of the contaminant from the spent carbon sorbent in the carbon reactivation zone is performed by introducing the spent carbon sorbent into the top part of the carbon reactivation zone and allowing the spent carbon sorbent to fall to the bottom of the carbon reactivation zone,
by introducing the second gas stream into the bottom part of the carbon reactivation zone and flowing the second gas stream upwards through the falling spent carbon sorbent,
by removing the separated reactivated carbon sorbent from the bottom part of the carbon reactivation zone, and,
by removing the combustion gas from the top part of the carbon reactivation zone.

20. The process of claim 5, wherein the removing of the contaminant from the spent carbon sorbent in the carbon reactivation zone is performed without oxidizing a detrimental amount of the carbon sorbent portion of the spent carbon sorbent.

21. The process of claim 5, wherein after the reactivated activated carbon in one of the sorption zones becomes contaminated thereby forming spent carbon sorbent, switching the flow of the contaminated main gas stream to the other one of the sorption zones, and, repeating the process for reactivating the last mentioned spent carbon sorbent.

22. The process of claim 5, wherein the conveying of spent carbon sorbent from the sorption zones to the carbon reactivation zone is performed in an enclosed conduit;
wherein the conveying the separated reactivated carbon sorbent to the reactivated sorbent storage zone is performed in an enclosed conduit; and,
wherein the conveying of the reactivated carbon sorbent from the reactivated sorbent storage zone to the sorption zones is performed in an enclosed conduit.

23. The process of claim 5, wherein after cooling the combustion gas to a third predetermined temperature as mentioned in step (j), thereafter further comprising:
scrubbing the combustion gas with a scrubbing agent effective for removing carbon dioxide; and
thereafter adjusting the relative humidity of the combustion gas as mentioned in step (k).

24. The process of claim 15, wherein the scrubbing agent is a dilute caustic solution.

25. The process of claim 5, wherein the conveying of spent carbon sorbent from the sorption zones to the carbon reactivation zone comprises conveying of spent carbon sorbent from the sorption zones to a spent sorbent storage zone, and
conveying the spent carbon sorbent from the spent sorbent storage zone to the carbon reactivation zone.

26. The process of claim 25, wherein the conveying of spent carbon sorbent from the sorption zones to the spent sorbent storage zone is performed in an enclosed conduit; and
wherein the conveying the spent carbon sorbent from the spent sorbent storage zone to the carbon reactivation zone is performed in an enclosed conduit.

27. A apparatus for cleaning contaminated gas comprising:

(a) a first and a second sorption chamber, each sorption chamber having
  (i) a gas inlet,
  (ii) a gas outlet,
  (iii) sorbent retaining means for holding a solid sorbent in a sorbent section within the sorption chamber so that gas flowing into the gas inlet must flow through solid sorbent contained therein,
  (iv) sorbent inlet means for charging solid sorbent into the sorption chamber and into the sorbent section, and
  (v) sorbent outlet means for removing spent solid sorbent from the sorbent section and from the sorption chamber;
(b) sorbent reactivation means for reactivating spent solid sorbent, the sorbent reactivation means having
  (i) sorbent inlet means for charging spent solid sorbent into the sorbent reactivation means,
  (ii) a gas inlet for introducing a purge gas into the sorbent reactivation means for removing contaminant from the spent solid sorbent,
  (iii) heating means for heating spent solid sorbent in the sorbent reactivation means,
  (iv) separating means for separating the contaminated purge gas from the reactivated solid sorbent,
  (v) sorbent outlet means for removing reactivated solid sorbent from the separating means and from the sorbent retaining means, and
  (vi) a gas outlet for removing contaminated gas from the separating means and from the sorbent reactivation means;
(c) conveying means for conveying spent solid sorbent from the sorbent outlet means of each of the sorption chambers to the sorbent inlet means of the sorbent reactivation means;
(d) contaminant burner means for burning contaminant in the purge gas from the sorbent reactivation means, the contaminant burner means having
  (i) a gas inlet for introducing contaminant gas from the sorbent reactivation means and oxygen into the contaminant burner means,
  (ii) a gas outlet for removing combustion gas from the contaminant burner means, and
  (iii) heating means for heating purge gas in the contaminant burner means;
(e) a conduit for conveying contaminated purge gas from the gas outlet of the sorbent reactivation means to the gas inlet of the contaminant burner means;
(f) cooling means for cooling combustion gas;
(g) a conduit for conveying combustion gas from the gas outlet of the contaminant burner means to the gas cooling means;
(h) humidity adjusting means for adjusting the relative humidity of the combustion gas from the cooling means;
(i) a conduit for conveying the combustion gas from the cooling means to the humidity adjusting means;
(j) a conduit for conveying combustion gas from the humidity adjusting means to the gas inlet of the sorption chambers; and,
(k) conveying means for conveying reactivated solid sorbent from the sorbent outlet means of the sorbent reactivation means to the sorption chambers.

28. The apparatus of claim 27, further comprising storage means for storing activated solid sorbent; and,
  conveying means for conveying solid sorbent from the storage means to the sorbent inlet means of the sorption chambers.

29. A apparatus for cleaning contaminated gas comprising:
(a) a first and a second sorption chamber, each sorption chamber having
  (i) a gas inlet for introducing contaminated gas into the sorption chambers,
  (ii) a gas outlet for venting cleaned gas,
  (iii) sorbent retaining means for holding a solid sorbent in a sorbent section within the sorption chamber so that gas flowing into the gas inlet must flow through solid sorbent contained therein,
  (iv) sorbent inlet means for charging solid sorbent into the sorption chamber and into the sorbent section, and
  (v) sorbent outlet means for removing spent solid sorbent from the sorbent section and from the sorption chamber;
(b) spent sorbent storage means for storing spent solid sorbent;
(c) conveying means for conveying spent solid sorbent from the sorbent outlet means of each of the sorption chambers to the spent sorbent storage means;
(d) sorbent reactivation means for reactivating spent solid sorbent, the sorbent reactivation means having
  (i) sorbent inlet means for charging spent solid sorbent into the sorbent reactivation means,
  (ii) a gas inlet for introducing a purge gas into the sorbent reactivation means for removing contaminant from the spent solid sorbent,
  (iii) heating means for heating spent solid sorbent in the sorbent reactivation means,
  (iv) separating means for separating the contaminated purge gas from the reactivated solid sorbent,
  (v) sorbent outlet means for removing reactivated solid sorbent from the separating means and from the sorbent retaining means, and
  (vi) a gas outlet for removing contaminated gas from the separating means and from the sorbent reactivation means;
(e) conveying means for conveying spent solid sorbent from the spent sorbent storage means to the sorbent inlet means of the sorbent reactivation means;
(f) contaminant burner means for burning contaminant in the purge gas from the sorbent reactivation means, the contaminant burner means having
  (i) a gas inlet for introducing contaminant gas from the sorbent reactivation means and oxygen into the contaminant burner means,
  (ii) a gas outlet for removing combustion gas from the contaminant burner means, and
  (iii) heating means for heating purge gas in the contaminant burner means;
(g) a conduit for conveying contaminated purge gas from the gas outlet of the sorbent reactivation means to the gas inlet of the contaminant burner means;
(h) cooling means for cooling combustion gas;

(i) a conduit for conveying combustion gas from the gas outlet of the contaminant burner means to the gas cooling means;

(j) humidity adjusting means for adjusting the relative humidity of the combustion gas from the cooling means;

(k) a conduit for conveying the combustion gas from the cooling means to the humidity adjusting means;

(l) a conduit for conveying combustion gas from the humidity adjusting means to the gas inlet of the sorption chambers;

(m) reactivated sorbent storage means for storing reactivated solid sorbent;

(n) conveying means for conveying reactivated solid sorbent from the sorbent outlet means of the sorbent reactivation means to the reactivated sorbent storage means; and, (o) conveying means for conveying reactivated solid sorbent from the reactivated sorbent storage means to the sorption chambers.

30. A apparatus for cleaning contaminated gas comprising:

(a) a first and a second sorption chamber, each sorption chamber having
  (i) a gas inlet for introducing contaminated gas into the sorption chambers,
  (ii) a gas outlet for venting cleaned gas,
  (iii) sorbent retaining means for holding a solid sorbent in a sorbent section within the sorption chamber so that gas flowing into the gas inlet must flow through solid sorbent contained therein,
  (iv) sorbent inlet means for charging solid sorbent into the sorption chamber and into the sorbent section, and
  (v) sorbent outlet means for removing spent solid sorbent from the sorbent section and from the sorption chamber;

(b) spent sorbent storage means for storing spent solid sorbent;

(c) conveying means for conveying spent solid sorbent from the sorbent outlet means of each of the sorption chambers to the spent sorbent storage means;

(d) sorbent reactivation means for reactivating spent solid sorbent, the sorbent reactivation means having
  (i) sorbent inlet means for charging spent solid sorbent into the sorbent reactivation means,
  (ii) a gas inlet for introducing a purge gas into the sorbent reactivation means for removing contaminant from the spent solid sorbent,
  (iii) heating means for heating spent solid sorbent in the sorbent reactivation means,
  (iv) separating means for separating the contaminated purge gas from the reactivated solid sorbent,
  (v) sorbent outlet means for removing reactivated solid sorbent from the separating means and from the sorbent retaining means, and
  (vi) a gas outlet for removing contaminated gas from the separating means and from the sorbent reactivation means;

(e) conveying means for conveying spent solid sorbent from the spent sorbent storage means to the sorbent inlet means of the sorbent reactivation means;

(f) contaminant burner means for burning contaminant in the purge gas from the sorbent reactivation means, the contaminant burner means having
  (i) a gas inlet for introducing contaminant gas from the sorbent reactivation means and oxygen into the contaminant burner means,
  (ii) a gas outlet for removing combustion gas from the contaminant burner means, and
  (iii) heating means for heating purge gas in the contaminant burner means;

(g) a conduit for conveying contaminated purge gas from the gas outlet of the sorbent reactivation means to the gas inlet of the contaminant burner means;

(h) cooling means for cooling combustion gas;

(i) a conduit for conveying combustion gas from the gas outlet of the contaminant burner means to the gas cooling means;

(j) first scrubbing means for removing a combustion product from the combustion gas;

(k) a conduit for conveying combustion gas from the gas cooling means to the first scrubbing means;

(m) second scrubbing means for removing a combustion product from the combustion gas;

(n) a conduit for conveying combustion gas from the first scrubbing means to the second scrubbing means;

(o) humidity adjusting means for adjusting the relative humidity of the combustion gas from the second scrubbing means, the humidity adjusting means having
  (i) cooling means for cooling combustion gas and forming a water condensate,
  (ii) separating means for separating the water condensate from the combustion gas, and
  (iii) heater means for heating the separated combustion gas;

(p) a conduit for conveying combustion gas from the second scrubbing means to the humidity adjusting means;

(q) a conduit for conveying combustion gas from the humidity adjusting means to the gas inlet of the sorption chambers;

(r) reactivated sorbent storage means for storing reactivated solid sorbent;

(s) conveying means for conveying reactivated solid sorbent from the sorbent outlet means of the sorbent reactivation means to the reactivated sorbent storage means; and, (t) conveying means for conveying reactivated solid sorbent from the reactivated sorbent storage means to the sorption chambers.

* * * * *